Figure 1:
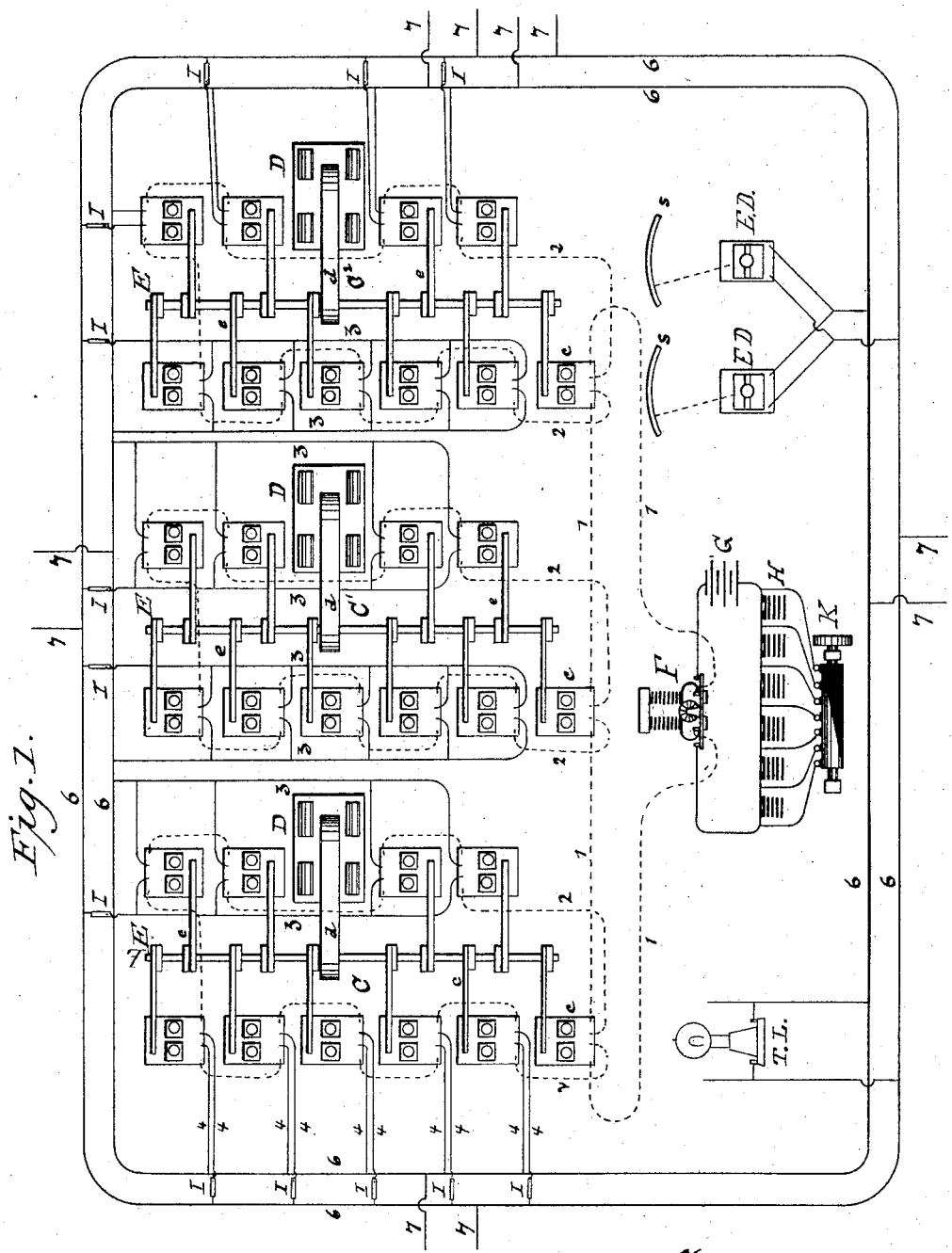

T. A. EDISON.
SYSTEM OF ELECTRICAL DISTRIBUTION.

No. 369,280. Patented Aug. 30, 1887.

Attest:
Sam. D. Mott
Jas. A. Payne.

Inventor:
T. A. Edison
per Dyer & Wilber
his Atty's

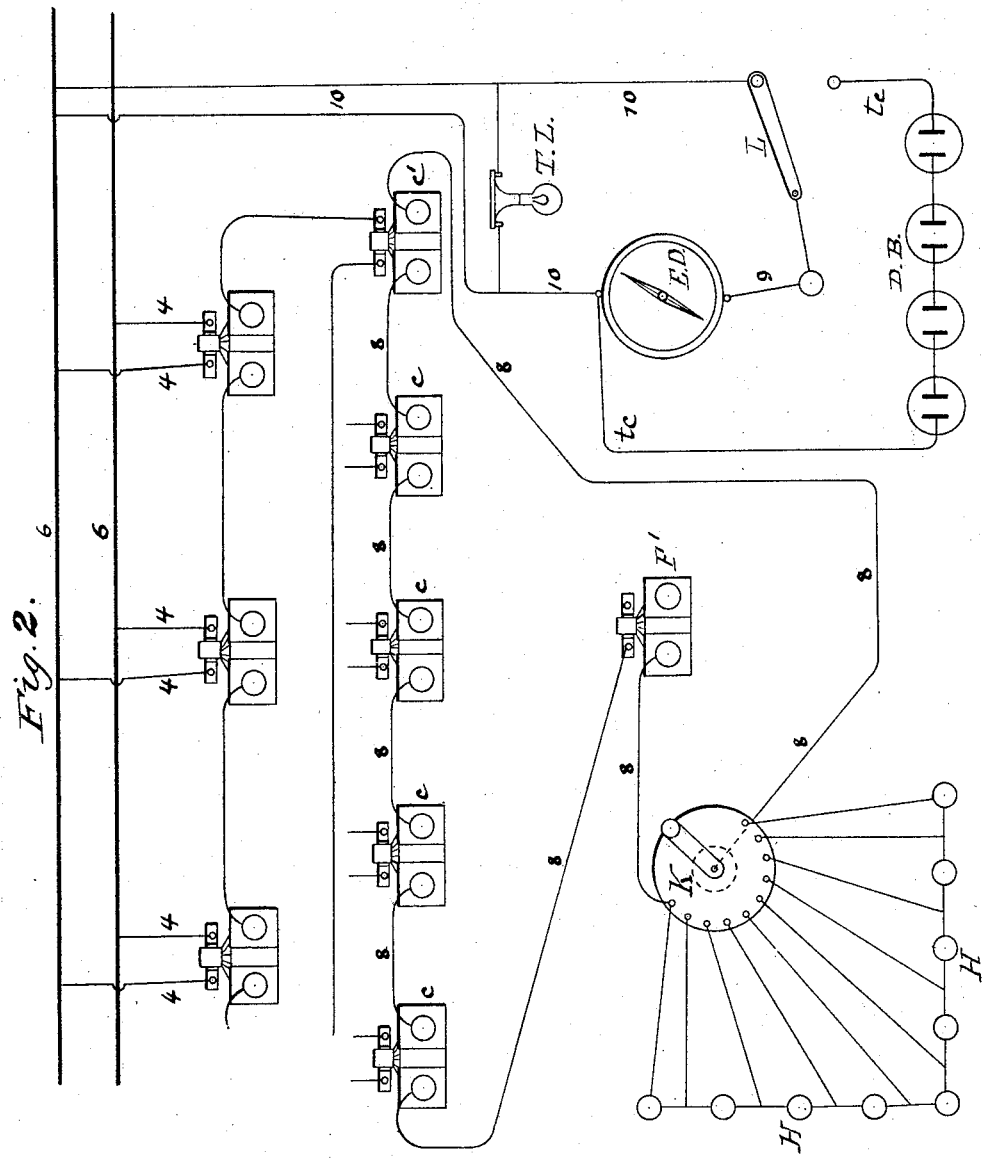

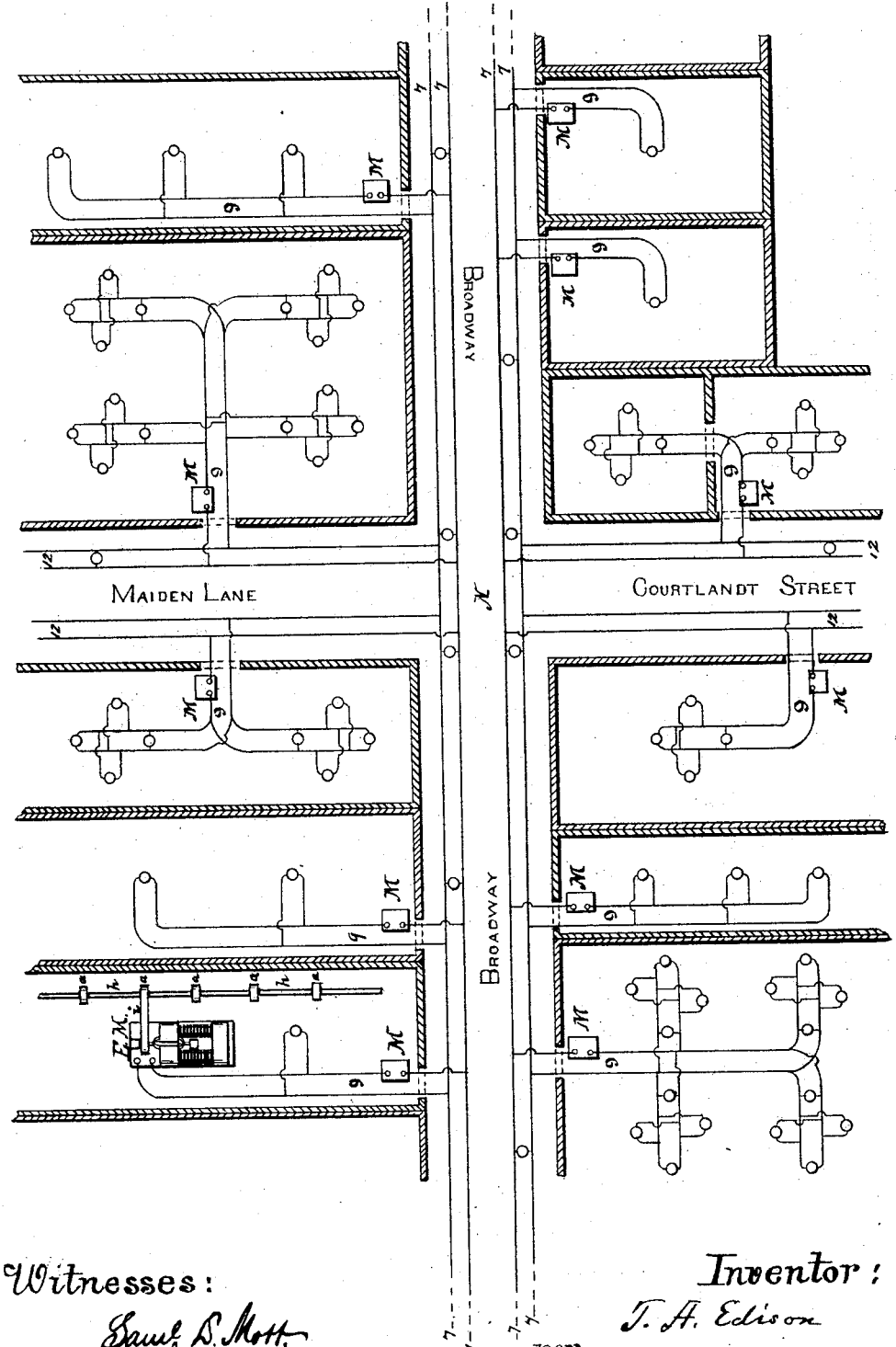

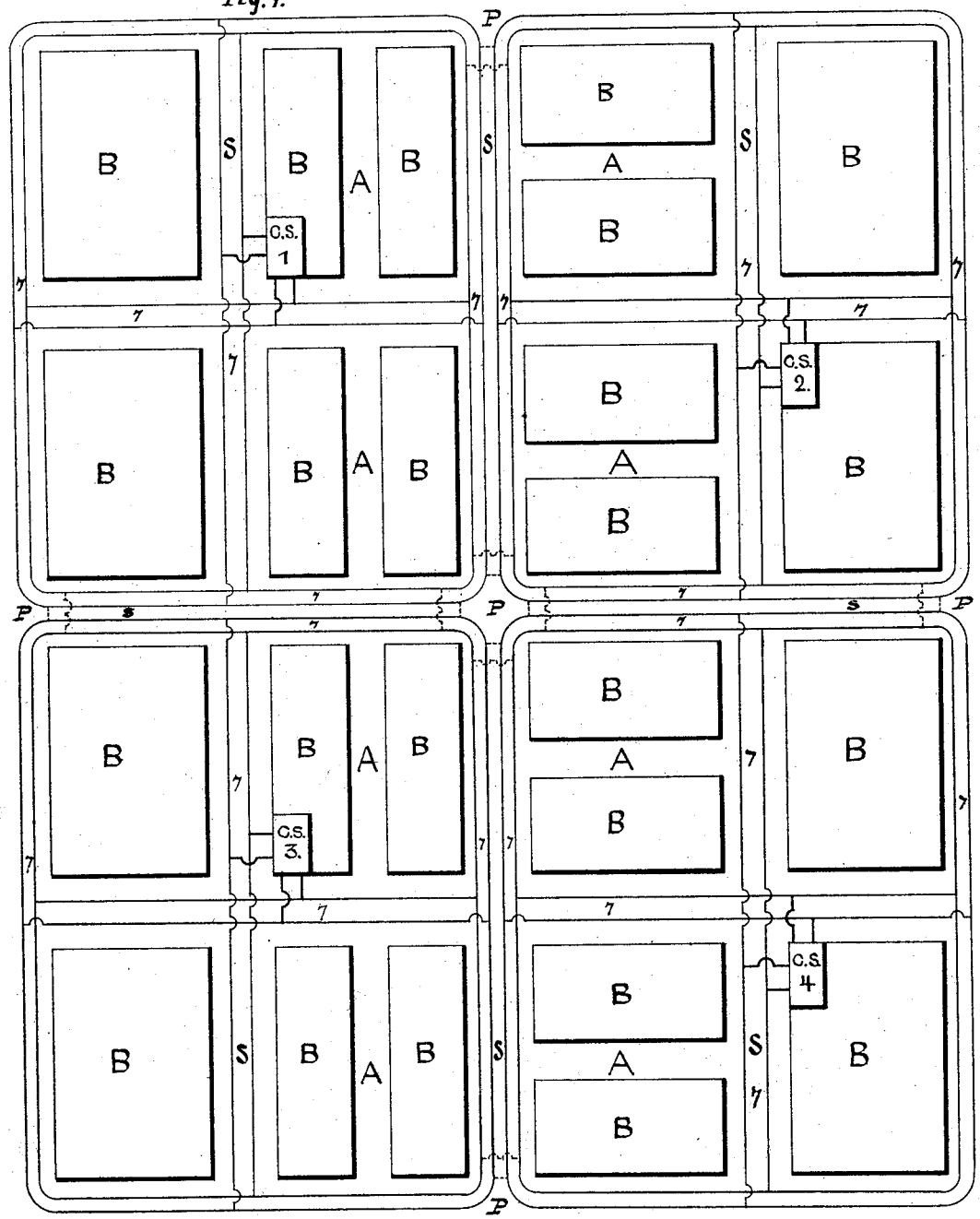

UNITED STATES PATENT OFFICE.

THOMAS A. EDISON, OF MENLO PARK, NEW JERSEY, ASSIGNOR, BY MESNE ASSIGNMENTS, TO THE EDISON ELECTRIC LIGHT COMPANY, OF NEW YORK, N. Y.

SYSTEM OF ELECTRICAL DISTRIBUTION.

SPECIFICATION forming part of Letters Patent No. 369,280, dated August 30, 1887.

Application filed February 5, 1880. Serial No. 2,282. Patented in England February 11, 1880, No. 602; in Italy May 10, 1880, No. 11,809; in Belgium May 15, 1880, No. 51,329; in France July 5, 1880, No. 136,399; in Canada July 21, 1880, No. 11,527, and in Austria-Hungary October 5, 1880, No. 30/1837.

*To all whom it may concern:*

Be it known that I, THOMAS A. EDISON, of Menlo Park, in the State of New Jersey, United States of America, have made certain new and useful Improvements in Furnishing Light and Power from Electricity, of which the following is a specification.

The object of this invention is to arrange a system for the generation, supply, and consumption, for either light or power, or both, of electricity, that all the operations connected therewith requiring special care, attention, or knowledge of the art shall be performed for many consumers at central stations, leaving the consumers only the work of turning off or on the supply, as may be desired—in other words, to so contrive means and methods that electricity may be supplied for consumption in a manner analogous to the systems for the supply of gas and water without requiring any greater care or technical knowledge on the part of the consumer than does the use of gas or water, in order that economy, reliability, and safety may be insured.

In carrying the invention into effect, a city, town, village, or locality may form one district, or, if the extent of territory makes it desirable, may be divided into several districts. In each district I provide a central station, at which are grouped a suitable prime motor or several motors, dependent upon the amount to be supplied, generators or means for converting the prime motive force into electricity, and means for determining and regulating the amount of electricity generated and supplied, in order that a constant pressure of electricity (so to speak) may be kept up. The prime motors are any suitable engines, steam or water, and one or a series of two or more is provided, as may be necessary, each of which is provided with its own system of shafting and belting, driving a number of magneto-electric machines, the number actuated by one prime motor being hereinafter termed a "battery."

It is to be noted, as is also shown in previous applications for patents made by me, that I make my field-of-force magnets exceedingly long and of an extremely large mass of metal in proportion to the mass of metal in the revolving armature carrying the generating-coils. The effect of this is to give to the generators field-magnets of great strength, so that currents of the desired high electromotive force can be generated in armatures of low resistance, and the waste of energy in the form of heat in such armatures will be reduced to the minimum. I desire to avoid also the use of generators having the coils of their field-magnets in series with their generating-coils, since this, besides being a defective arrangement with respect to regulation, also increases the internal resistance of the machines, and results in an objectionable waste of energy; hence I prefer to keep the coils of the field-of-force magnets and the generating-coils separate, and that one machine in each battery (which machine may be termed the "battery field-of-force generator") be used to supply the requisite energy to the field-of-force magnets of the other machines in such battery, (which may be termed the "supply-generators.") The coils of the field-of-force magnets are connected as a series or in a multiple arc in one circuit, while the generating-coils of the supply-generators of each battery are all connected in a multiple arc to the main conductors. This arrangement, it is seen, gives great economy, as the per cent. of the entire current generated in each battery absorbed in keeping up the magnetic maximum in the field-of-force magnets when it is furnished by one special machine of the battery, the number given it to feed being properly calculated, being less than when a portion of the current generated in each machine is absorbed in its own field-of-force magnets.

Where a single battery of machines is used, it is preferable, in view of what has been hereinbefore stated, that the current for the coils of the field-of-force magnets of the field-of-force generator of the battery be supplied by a small galvanic battery; but if more than one battery of machines be used the field-of-force generators of all the batteries are fed from one or more prime field-of-force generators connected in a multiple arc or in a series, the field-of-force magnets of the prime field-of-force generator or generators used being kept magnetically saturated by a weak galvanic-battery current, as before set forth. For instance, a weak galvanic current supplies the field-current necessary for one prime field-of-force generator, which in turn feeds the field-of-force magnets of the field-of-force generators of the batteries of twenty or thirty machines, the ultimate effect in the generation of current depending upon (as one important factor) the tension of the galvanic current sent through the field-of-force coils of the prime field-of-force generator. This prime field-of-force generator may, however, be a dynamo-electric machine instead of a magneto-machine, its field of force being kept up by the current generated in the machine instead of by a galvanic current.

At the central station all the supply-generating coils or batteries thereof are connected to conductors on the multiple-arc system, and from these conductors at the station main conductors (which for convenience may be called simply the "mains") connected thereto, also on the multiple-arc system, lead in any and all desired directions for conveying the energy to the points where work, either by translation into light or motive power, is to be done. All of such conductors from the generators at the station to the lamps are made in pairs—one for the outgoing current and the other for the returning current of electricity, the circuits throughout the system being complete or round metallic circuits, the conductors of which are well insulated from each other and from the earth. The use of the earth for one-half of the circuit would largely increase the difficulties arising from the grounding of the conductors or the crossing of the conductors among themselves or with the conductors of other circuits to such an extent that a system so constructed would be impracticable.

In order to give a better understanding of the method of regulating what, for convenience, may be called the "pressure" of the current through the entire system, I will here state that all the devices for translation of electricity into work are arranged on the multiple-arc system, each device being in its own derived circuit, the effect being, in substance, to give each a circuit from the generating source independent of the circuit of all the other devices. As a resultant, it follows that the greater the number of translating devices brought into circuit the less the total resistance of the circuit. For instance, I prefer that my lamps should each be of about one hundred ohms resistance. Then, if one lamp only be in circuit, there is a resistance of one hundred ohms. If another lamp be put in circuit, two circuits, each of one hundred ohms, are provided for the current, making the net total resistance to the current fifty ohms, although the resistance in each derived circuit remains unchanged. This effect is ordinarily opposite to the effect produced by the addition of lamps when they are connected in an ordinary straight circuit, each one then adding to the resistance of the circuit.

The bringing into operation successively of numbers of the devices, and thereby making more paths or circuits for the currents, does not appreciably lessen the pressure or diminish the effect upon the devices in use, the active forces at the central station—viz., prime field-of-force generators and motive power—remaining unchanged until the net resistance of the devices in circuit exterior to the battery of machines is so diminished as to approach in a degree the resistance of the battery and main conductors, it being remembered that as the machines of a battery are connected in multiple arc the net internal resistance of a battery is as many times less than one machine as there are machines in the battery.

To avoid any appreciable variations and insure uniformity, it is essential that any lessening of pressure be immediately indicated, in order that just sufficient energy be generated and sent out to keep up an equal flow through the circuit of each translating device—that is, that the pressure be kept up uniform, whether more or less translating devices be in circuit. This is attained by providing at the central station means for constantly indicating the pressure and for regulating the production if appreciable variation be indicated. At each central station test-lights are arranged, so that an approximate visual test of the effect of pressure upon the circuit of any translating devices in use may be shown. From what has been said, it is evident that as more or less translating devices are brought into circuit the total resistance of the circuit, or all the circuits thereof, to the flow of all the current generated varies. To indicate this electro-dynamometers, galvanometers, or electrometers are placed across the main conductor at the central station, or by return-wire at any point in the circuit, with a zero-mark placed to correspond with the deflection consequent upon the maintenance of the proper amount of pressure. It may be advisable (and I have so done) to place at the central station a series of standard Daniell batteries, connected by a switch-circuit to the galvanometers or electro-dynamometers, in order that they may be frequently tested for any inaccuracy occurring from any cause whatever. By these means any error whatever therein is readily detected.

To correct variations in the pressure various means may be employed. Each supply-generator may be connected into the circuit through a switch, and each series may be likewise so connected, so that the current of one or more of a series, or one or more entire series, may be cut out or thrown into the circuit, or each machine may be arranged so as to be disconnected from the prime motor; or, when needed, the prime motor of an entire series may be disconnected. The plan I prefer, however, is to arrange in connection with the circuit of the battery feeding the field-of-force magnets of the prime field-of-force generator before referred to a series of resistances, so that the energy of the battery-current may be varied, this variation causing in turn a variation in the current induced in the prime field-of-force generator and in all the generators directly or indirectly controlled thereby. Where a dynamo-machine is used these resistances are to be used in the same manner in connection with the circuit, including the coils around the field-magnets. For distributing the current thus generated and regulated at the central stations I prefer to use conductors within insulated pipes or tubing, made water-tight and buried beneath the earth, provision being made at suitable intervals for house or side connections, as shown in a prior application of mine. While this plan is preferable for many reasons, it is evident that conductors may be carried in the air or over house-tops.

While only one pair of conductors may be laid on each street, I prefer, especially where streets are wide, to lay a pair of conductors along each side of the street, near the curb. At proper intervals street-lamps may be connected thereto by derived circuits. From main conductors on principal streets subsidiary main conductors are laid through side streets. From the street conductors, wherever desired, derived circuits are led into houses, one of the conductors passing through a suitable meter, preferably one which measures the amount of electricity passing through, as shown in a prior application of mine for a patent.

In the house each translating device is placed in a derived circuit, the entire system of means for generation, conduction, and translation being one great multiple-arc system with complete or round metallic circuits. The translating devices in each house may be either for light or power, or both. For light, the electric lamp consisting of an incandescing material hermetically sealed in glass (shown in other applications filed by me) is preferred. This lamp is made of a high resistance in comparison with that of any electric lamps which, to my knowledge, have been proposed.

In lights heretofore proposed the endeavor seems to have been to lessen the resistance of the carbon, none having been suggested of higher resistance than, say, ten ohms; but I have discovered that a very much higher resistance—say one hundred ohms—must be used, in order that a number may be economically and successfully used in a system.

The motors used should be so constructed that each, with a constant flow or pressure of current, will give the exact power required. This requires that each motor should be wound with finer or coarser wire and into more or less convolutions, which determine the maximum effect of the motor. In addition, as the motors may be run with variable loads or amounts of work to perform, and as irregularity of speed would be a consequent thereof, it would be preferable to provide each motor with a governor which an excessive speed would operate to break the circuit of the motor or to otherwise control it. A preferable form of governor therefore will form the subject-matter of an application for a patent to be filed by me.

A system arranged as thus described provides for all the conditions precedent to an economical and reliable utilization of electricity as a lighting or motive-power agent.

As within certain ascertainable limits, the greater the horse-power of an engine the less the proportionate cost per horse-power. By consolidating at one station the prime motive force necessary to the generation of a supply for many consumers a great economy as to production occurs.

As ordinarily proposed, each electric light requires its own regulator, which usually is either thermostatic or magnetic, breaking the circuit or bringing in resistance—in any case making a cumbrous lamp, requiring delicate management and constant attention. By regulating at the central station entirely, I am enabled to use a small separate lamp, which may be used with the exercise of no more than ordinary care or attention. The distribution is so provided for that tampering therewith is guarded against and that connections from the mains to localities of translation are readily made.

The means for measuring insure accurateness in furnishing a basis for equitable charges for the amount used by any particular consumer.

In the drawings accompanying and forming part of this specification an arrangement of means is shown for carrying my invention into effect, although it is to be particularly noted that the invention is not dependent upon the specific means and their arrangement noted and shown, but that they may be varied without departing from the spirit of my invention. The drawings illustrate, however, what I now consider the more preferable means and arrangements.

In these drawings, Figure 1 is a plan view of a central station. Fig. 2 is a modification of Fig. 1. Fig. 3 is a plan view illustrating the street-mains and house-connections with translating devices properly introduced. Fig. 4 is a plan showing a locality divided into four districts.

In Fig. 1 three batteries of generation, C C' C², are shown, which number may be increased or diminished, as circumstances may demand. One generator, c, of each battery is used to generate the current feeding the field-of-force magnets of the other machines in its battery, the circuit from such field-generator through the field-of-force coils in each battery being shown by the broken lines 2 2 2. For actuating the rotating parts an engine, D, is used with each battery, connected by belt d to line of shafting E, from which belts *e* pass to the generator. The coils of each battery in which currents are generated are connected, as in C' and C², in multiple arc to conductors 3 3 3 3, which in turn are connected in multiple arc to the main conductors 6 6, from which lead in multiple arc the street conductors or mains 7 7, or, as shown in part of battery C, each machine may be directly connected in multiple arc to the station-conductors 6 6. F is the prime field-of-force generator, supplying the battery field-of-force generators *c c c*, its circuit being shown in broken lines 1 1. The field-of-force magnets of F are magnetized by a current from the galvanic battery G, in whose circuit is arranged the series of conductors H, provided with the cut-out K, by which more or less of the resistances are put in or out of the circuit feeding the field of F. This arrangement forms a very effective and simple method of regulating the production of current or the pressure at the central station, for the current generated by F being dependent upon the intensity of the magnetization of its field-of-force magnets, which in turn depends upon the current transmitted around the magnets by the battery G, as the resistance varies such current, it follows that by varying the resistance in the circuit of G the current generated by F varies, which in turn varies the current generated in *c c c*, which in turn varies the current generated in the supply-machines of the batteries, proportionate increase of current and rise of pressure in the latter following increase of current around the magnets of F, and vice versa. One or more test-lamps, T L, are placed at the central station in derived circuits to serve as a photometric test of the pressure in the lines. For more accurately indicating variations in the pressure, one or more electrometers, galvanometers, or electro-dynamometers, E D, are placed in derived circuits, with a scale-mark indicating the pressure determined on as the standard pressure to be maintained. By the proper use of these indicating devices and the regulating devices described, a uniform pressure may be readily and easily maintained through all the mains. It is preferable to connect all circuits from the generating-machines to the main conductors 6 6 through switches I I I, so that an entire battery or any portion thereof may be thrown in or out of circuit, as the draft upon the station may indicate. It is to be noted, also, that the belt and pulleys of each machine are to be arranged by any of the well-known plans, that it may be disconnected from the motor when desired. These means may be used, when desired, as means of regulation, the number of machines in operation being controlled thereby, while the effective force of each machine while in operation is controlled by the resistances. The engines may be of any desired pattern or power, the number of machines in any one battery being limited by the power of the engine.

In Fig. 2, *c c c c* are the field-of-force generators of batteries not shown, while *c'* is the field-of-force generator of a battery, of which three supply-generators are shown, connected to station-conductors 6 6, as before explained. The prime field-of-force generator F' is in this case a dynamo-electric machine instead of a magneto-electric machine, as shown in Fig. 1, all its coils being included in one circuit, S S, which passes around the field-of-force magnets of the battery-generators *c c c c'*. The same principle of regulation is used, however, the resistances H and cut-out K therefor being arranged in connection with the circuit through F', so as to cause variation in the tension of the current therein, as and with the result before explained. In this figure there is shown what may be used also in connection with the plan shown in Fig. 1—means of testing the electro-dynamometers E D or other indicating instrument used. From a standard Daniell battery, D B, a circuit, *t c*, may be formed around E D by means of the switch L, so that, when desired, the correctness of E D may be ascertained and any inaccuracies which might arise be guarded against.

In Fig. 3 the mains 7 7 are shown, leading from corresponding wires at central station (see Fig. 1) down each side of the street. At side streets conductors 12 12 branch off. The small circles *o* in this figure indicate electric lamps. For street-lighting they are placed, as shown, in derived circuits from the street-mains. From the mains derived circuits 9 9 lead into houses, in which are placed at some suitable spot the meters M, through which one of the house-conductors passes, and by which the amount of electricity supplied to the house is accurately determined. Upon these house-circuits are arranged lamps on the multiple-arc system in such number, position, and grouping as may be desired. In these circuits I also propose to introduce electromotors E M, for furnishing light motive power. From the motor a belt, *i*, leads to a line of shafting, *h*, and pulleys *a a*, for any needed distribution of the power; or the belt *i* may pass directly to a sewing or other machine, a separate motor being used for each power-driven machine. Where motors are desired, each, preferably, should be made of a power proportional to the maximum work to be done. While the electrical tension in each machine is regulated at the central station, yet if the maximum load or work be diminished at any particular motor its speed would necessarily be increased. It also might be desired at times to diminish the normal speed of the motor. In order, therefore, that some determinate speed may be maintained, irrespective of load or work, each motor should be furnished with a governor. For this purpose I prefer a governor invented by me, and to be the subject of a separate application, which acts to break the circuit when a certain determinate speed is exceeded.

In Fig. 4 is shown a locality divided into four supply-districts. Each is provided with its own central station, marked C. S. 1, C. S. 2, C. S. 3, and C. S. 4. From each proper mains, 7 7, lead out, as before described. At convenient points, however—say P P—connections between the mains of the systems may be made, the effect then being to merge the entire locality into one large district with four supply-stations, the pressure through all being uniform and each station doing its own quota toward maintaining the pressure uniform. The use of four stations and districts in this diagram is arbitrary and for illustration only, as the number actually to be made in any one locality depends upon the needs of the locality.

It is to be noted that all the circuits from the generators to the lamps or other translating devices are complete or round metallic circuits, as before stated.

What I claim is—

1. In a system of electrical distribution, the combination, with a complete or round metallic circuit, of a number of generators connected in multiple arc with such circuit, and consisting each of an armature revolving in a magnetic field, and a number of translating devices, also connected in multiple arc with said circuit, substantially as set forth.

2. In a system of electrical distribution, the combination, with a complete or round metallic circuit, of a number of generators connected in multiple arc with such circuit, and consisting each of an armature of low resistance revolving in a magnetic field of great strength, and a number of translating devices, also connected in multiple arc with said circuit, substantially as set forth.

3. In a system of electrical distribution, the combination, with a complete or round metallic circuit, of a number of generators connected in multiple arc with such circuit, and consisting each of an armature revolving in a magnetic field and having the coils of its field-of-force magnet and its generating-coils separate, (i. e., not connected in series,) and a number of translating devices, also connected in multiple arc with said circuit, substantially as set forth.

4. In a system of electrical distribution, the combination, with a complete or round metallic circuit, of a number of generators connected in multiple arc with such circuit, and consisting each of an armature revolving in a magnetic field, a number of translating devices, also connected in multiple arc with said circuit, and a regulator for regulating the supply of current to such circuit, substantially as set forth.

5. In a system of electrical distribution, the combination, with a complete or round metallic circuit, of means for generating electricity connected with such circuit, and consisting of one or more dynamo or magneto electric machines, translating devices connected in multiple arc with said circuit, an indicator of the electric pressure upon such circuit, and a regulator under control of the operator for regulating the supply of current to such circuit, substantially as set forth.

6. In a system of electrical distribution, the combination, with a complete or round metallic circuit, of a number of generators connected in multiple arc with such circuit, and consisting each of an armature revolving in a magnetic field, translating devices connected in multiple arc with said circuit, an indicator of the electric pressure upon such circuit, and a regulator under control of the operator for regulating the supply of current to such circuit, substantially as set forth.

7. In a system for the generation and distribution of electricity for light or power through cities or towns or districts thereof, a central station whereat are combined a number of generators of electricity connected in multiple arc, and consisting each of an armature revolving in a magnetic field, an indicator of the electric pressure, and a regulator of the current generated, conductors forming complete or round metallic circuits leading from such station to distribute the current throughout the system, and translating devices connected in multiple arc with such conductors, substantially as set forth.

8. In a system for the generation and distribution of electricity for light or power through cities or towns or districts thereof, a central station whereat are combined a number of generators of electricity connected in multiple arc, and consisting each of an armature revolving in a magnetic field, an indicator of the electric pressure, and a regulator of the current generated, conductors forming complete or round metallic circuits leading from such station to distribute the current throughout the system, translating devices connected in multiple arc with such conductors, and meters at the houses for measuring the current supplied to such translating devices, substantially as set forth.

In testimony whereof I have hereunto affixed my signature this 28th day of January, A. D. 1880.

THOMAS A. EDISON.

Witnesses:
C. P. MOTT,
S. D. MOTT.